(12) United States Patent
Hauck

(10) Patent No.: US 8,275,910 B1
(45) Date of Patent: Sep. 25, 2012

(54) SOURCE PACKET BRIDGE

(75) Inventor: Jerrold V. Hauck, Windermere, FL (US)

(73) Assignee: Apple Inc., Cupertino, CA (US)

( * ) Notice: Subject to any disclaimer, the term of this patent is extended or adjusted under 35 U.S.C. 154(b) by 1008 days.

(21) Appl. No.: 10/613,867

(22) Filed: Jul. 2, 2003

(51) Int. Cl.
*G06F 15/16* (2006.01)
*H04J 3/06* (2006.01)

(52) U.S. Cl. .......... 709/249; 709/201; 370/516

(58) Field of Classification Search .......... 709/249, 709/231
See application file for complete search history.

(56) References Cited

U.S. PATENT DOCUMENTS

| | | | |
|---|---|---|---|
| 4,156,798 A | 5/1979 | Doelz | 179/15 AL |
| 4,194,113 A | 3/1980 | Fulks et al. | 371/20 |
| 5,014,262 A | 5/1991 | Harshavardhana | 370/16 |
| 5,274,631 A | 12/1993 | Bhardwaj | 370/60 |
| 5,321,812 A | 6/1994 | Benedict et al. | 395/200 |
| 5,343,461 A | 8/1994 | Barton et al. | 370/13 |
| 5,371,880 A * | 12/1994 | Bhattacharya | 713/400 |
| 5,394,556 A | 2/1995 | Oprescu | 395/800 |
| 5,406,643 A | 4/1995 | Burke et al. | 395/200 |
| 5,452,330 A | 9/1995 | Goldstein | 375/257 |
| 5,490,250 A | 2/1996 | Reschke et al. | 375/185.01 |
| 5,490,253 A | 2/1996 | Laha et al. | 395/304 |
| 5,495,481 A | 2/1996 | Duckwall | 370/85.2 |
| 5,524,254 A | 6/1996 | Morgan et al. | 395/800 |
| 5,539,390 A | 7/1996 | Nagano et al. | 340/825.07 |
| 5,541,670 A | 7/1996 | Hanai | 348/705 |
| 5,568,487 A | 10/1996 | Sitbon et al. | 370/94.1 |
| 5,568,641 A | 10/1996 | Nelson et al. | 395/700 |
| 5,583,922 A | 12/1996 | Davis et al. | 379/96 |
| 5,590,116 A * | 12/1996 | Zhang | 370/253 |
| 5,617,539 A * | 4/1997 | Ludwig et al. | 709/205 |
| 5,621,659 A | 4/1997 | Matsumoto et al. | 364/514 R |
| 5,630,173 A | 5/1997 | Oprescu | 395/860 |
| 5,632,016 A | 5/1997 | Hoch et al. | 395/200.02 |

(Continued)

FOREIGN PATENT DOCUMENTS

EP 1 085 706 A2 3/2001

(Continued)

OTHER PUBLICATIONS

Bregni et al., Jitter Testing Technique and Results at VC-4 Desynchronizer Output of SDH Equipment, *IEEE International Conference on Communications*, vol. 3, pp. 1407-1410, May 12, 1994.

(Continued)

*Primary Examiner* — Peling Shaw
*Assistant Examiner* — Joiya M Cloud
(74) *Attorney, Agent, or Firm* — Gazdzinski & Associates, PC

(57) ABSTRACT

A communication function between ports on a node that does not require a common time base to be distributed across the network is disclosed. A data stream received over a first port is placed on an interlace between nodes using the time base of the first port; a second port samples the data stream on the interface and timestamps it using the time base of the second port. The data stream is timestamped by the second port and packetized before transmitted to the second node to another bridge or device. Alternatively, the first port extracts a time stamp from the data stream and calculates an offset using a cycle timer value from the bus connected to the first port. The offset is added to the cycle timer value on the bus connected to the second port and used to timestamp the data stream.

21 Claims, 2 Drawing Sheets

U.S. PATENT DOCUMENTS

| | | | |
|---|---|---|---|
| 5,640,595 A | 6/1997 | Baugher et al. | 395/830 |
| 5,642,515 A | 6/1997 | Jones et al. | 395/727 |
| 5,654,657 A | 8/1997 | Pearce | 327/163 |
| 5,684,715 A | 11/1997 | Palmer | 364/514 C |
| 5,701,476 A | 12/1997 | Fenger | 395/652 |
| 5,701,492 A | 12/1997 | Wadsworth et al. | 395/712 |
| 5,706,278 A | 1/1998 | Robillard et al. | 370/222 |
| 5,712,834 A | 1/1998 | Nagano et al. | 369/19 |
| 5,719,862 A | 2/1998 | Lee et al. | 370/355 |
| 5,754,765 A | 5/1998 | Danneels et al. | 395/200.1 |
| 5,764,930 A | 6/1998 | Staats | 395/287 |
| 5,784,648 A | 7/1998 | Duckwall | 395/860 |
| 5,802,048 A | 9/1998 | Duckwall | 370/389 |
| 5,802,057 A | 9/1998 | Duckwall et al. | 370/408 |
| 5,802,365 A | 9/1998 | Kathail et al. | 395/681 |
| 5,805,073 A | 9/1998 | Nagano et al. | 340/825.07 |
| 5,809,331 A | 9/1998 | Staats et al. | 395/830 |
| 5,819,115 A | 10/1998 | Hoese et al. | 395/888 |
| 5,826,027 A | 10/1998 | Pedersen et al. | 395/200.51 |
| 5,832,298 A | 11/1998 | Sanchez et al. | 395/828 |
| 5,835,761 A | 11/1998 | Ishii et al. | 395/653 |
| 5,845,152 A | 12/1998 | Anderson et al. | 395/872 |
| 5,854,893 A * | 12/1998 | Ludwig et al. | 709/204 |
| 5,867,730 A | 2/1999 | Leyda | 395/830 |
| 5,875,301 A | 2/1999 | Duckwall et al. | 395/200.51 |
| 5,923,663 A | 7/1999 | Bontemps et al. | 370/445 |
| 5,930,480 A | 7/1999 | Staats | 395/200.74 |
| 5,935,208 A | 8/1999 | Duckwall et al. | 709/221 |
| 5,938,764 A | 8/1999 | Klein | 713/1 |
| 5,940,600 A | 8/1999 | Staats et al. | 395/287 |
| 5,954,796 A | 9/1999 | McCarty et al. | 709/222 |
| 5,968,152 A | 10/1999 | Staats | 710/104 |
| 5,970,052 A | 10/1999 | Lo et al. | 370/241 |
| 5,987,605 A | 11/1999 | Hill et al. | 713/2 |
| 5,991,842 A | 11/1999 | Takayama | 710/105 |
| 6,009,480 A | 12/1999 | Pleso | 710/8 |
| 6,032,202 A | 2/2000 | Lea et al. | 710/8 |
| 6,032,261 A | 2/2000 | Hulyalkar | 713/400 |
| 6,038,234 A | 3/2000 | LaFollette et al. | 370/443 |
| 6,038,625 A | 3/2000 | Ogino et al. | 710/104 |
| 6,070,187 A | 5/2000 | Subramaniam et al. | 709/220 |
| 6,073,206 A | 6/2000 | Piwonka et al. | 711/102 |
| 6,091,726 A | 7/2000 | Crivellari et al. | 370/392 |
| 6,115,764 A | 9/2000 | Chisholm et al. | 710/100 |
| 6,122,248 A | 9/2000 | Murakoshi et al. | 370/216 |
| 6,131,129 A | 10/2000 | Ludtke et al. | 710/5 |
| 6,131,134 A | 10/2000 | Huang et al. | 710/103 |
| 6,131,163 A | 10/2000 | Wiegel | 713/201 |
| 6,133,938 A | 10/2000 | James | 348/8 |
| 6,138,196 A | 10/2000 | Takayama et al. | 710/105 |
| 6,141,702 A | 10/2000 | Ludtke et al. | 710/5 |
| 6,141,767 A | 10/2000 | Hu et al. | 714/1 |
| 6,145,018 A | 11/2000 | LaFollette et al. | 710/8 |
| 6,157,972 A | 12/2000 | Newman et al. | 710/100 |
| 6,160,796 A | 12/2000 | Zou | 370/257 |
| 6,167,532 A | 12/2000 | Wisecup | 714/23 |
| 6,173,327 B1 | 1/2001 | De Borst et al. | 709/231 |
| 6,192,189 B1 | 2/2001 | Fujinami et al. | 386/96 |
| 6,199,119 B1 | 3/2001 | Duckwall et al. | 710/8 |
| 6,202,210 B1 | 3/2001 | Ludtke | 725/20 |
| 6,212,171 B1 | 4/2001 | LaFollette et al. | 370/257 |
| 6,212,633 B1 | 4/2001 | Levy et al. | 713/153 |
| 6,219,697 B1 | 4/2001 | Lawande et al. | 709/221 |
| 6,226,680 B1 | 5/2001 | Boucher et al. | 709/230 |
| 6,233,615 B1 | 5/2001 | Van Loo | 709/224 |
| 6,233,624 B1 | 5/2001 | Hyder et al. | 709/237 |
| 6,243,778 B1 | 6/2001 | Fung et al. | 710/113 |
| 6,247,063 B1 | 6/2001 | Ichimi et al. | 709/250 |
| 6,247,083 B1 | 6/2001 | Hake et al. | 710/107 |
| 6,253,114 B1 | 6/2001 | Takihara | 700/83 |
| 6,253,225 B1 | 6/2001 | Hyder et al. | 709/321 |
| 6,256,059 B1 | 7/2001 | Fichtner | 348/61 |
| 6,260,063 B1 | 7/2001 | Ludtke et al. | 709/224 |
| 6,266,334 B1 | 7/2001 | Duckwall | 370/397 |
| 6,266,344 B1 | 7/2001 | Fujimori et al. | 370/468 |
| 6,266,701 B1 | 7/2001 | Sridhar et al. | 709/232 |
| 6,275,889 B1 | 8/2001 | Saito | 710/129 |
| 6,282,597 B1 | 8/2001 | Kawamura | 710/105 |
| 6,292,840 B1 | 9/2001 | Blomfield Brown et al. | 709/247 |
| 6,295,479 B1 | 9/2001 | Shima et al. | 700/83 |
| 6,308,222 B1 | 10/2001 | Krueger et al. | 709/247 |
| 6,311,228 B1 | 10/2001 | Ray | 709/321 |
| 6,314,461 B2 | 11/2001 | Duckwall et al. | 709/221 |
| 6,343,321 B2 | 1/2002 | Patki et al. | 709/227 |
| 6,345,315 B1 | 2/2002 | Mishra | 709/329 |
| 6,347,091 B1 * | 2/2002 | Wallentin et al. | 370/437 |
| 6,347,362 B1 | 2/2002 | Schoinas et al. | 711/147 |
| 6,353,868 B1 | 3/2002 | Takayama et al. | 710/129 |
| 6,356,558 B1 | 3/2002 | Hauck et al. | 370/450 |
| 6,363,073 B2 * | 3/2002 | Nichols | 370/395.62 |
| 6,363,085 B1 | 3/2002 | Samuels | 370/502 |
| 6,373,821 B2 | 4/2002 | Staats | 370/252 |
| 6,385,679 B1 | 5/2002 | Duckwall et al. | 710/119 |
| 6,405,247 B1 | 6/2002 | Lawande et al. | 709/221 |
| 6,411,628 B1 | 6/2002 | Hauck et al. | 370/447 |
| 6,418,150 B1 | 7/2002 | Staats | 370/503 |
| 6,425,019 B1 | 7/2002 | Tateyama et al. | 710/11 |
| 6,426,962 B1 | 7/2002 | Cabezas et al. | 370/516 |
| 6,430,626 B1 * | 8/2002 | Witkowski et al. | 709/249 |
| 6,442,630 B1 | 8/2002 | Takayama et al. | 710/105 |
| 6,446,116 B1 | 9/2002 | Burridge | 709/214 |
| 6,446,142 B1 | 9/2002 | Shima et al. | 710/16 |
| 6,452,975 B1 | 9/2002 | Hannah | 375/222 |
| 6,457,086 B1 | 9/2002 | Duckwall | 710/305 |
| 6,466,982 B1 | 10/2002 | Ruberg | 709/227 |
| 6,496,862 B1 | 12/2002 | Akatsu et al. | 709/224 |
| 6,502,144 B1 | 12/2002 | Accarie | 710/8 |
| 6,513,085 B1 | 1/2003 | Gugel et al. | 710/305 |
| 6,519,657 B1 | 2/2003 | Stone et al. | 710/10 |
| 6,529,522 B1 | 3/2003 | Ito et al. | 370/466 |
| 6,532,232 B1 * | 3/2003 | Goodwin, III | 370/389 |
| 6,574,588 B1 | 6/2003 | Shapiro et al. | 703/24 |
| 6,587,904 B1 | 7/2003 | Hauck et al. | 710/107 |
| 6,591,300 B1 | 7/2003 | Yurkovic | 709/226 |
| 6,594,238 B1 * | 7/2003 | Wallentin et al. | 370/252 |
| 6,606,320 B1 | 8/2003 | Nomura et al. | 370/395.1 |
| 6,618,750 B1 | 9/2003 | Staats | 709/209 |
| 6,618,785 B1 | 9/2003 | Whitby-Streves | 710/305 |
| 6,621,832 B2 | 9/2003 | Staats | 370/503 |
| 6,628,607 B1 | 9/2003 | Hauck et al. | 370/216 |
| 6,631,426 B1 | 10/2003 | Staats | 710/9 |
| 6,636,914 B1 | 10/2003 | Teener | 710/240 |
| 6,639,918 B1 | 10/2003 | Hauck et al. | 370/462 |
| 6,643,714 B1 | 11/2003 | Chrysanthakopoulos | 710/8 |
| 6,661,811 B1 * | 12/2003 | Baker | 370/516 |
| 6,671,768 B1 | 12/2003 | Brown | 710/102 |
| 6,681,261 B2 * | 1/2004 | Mancusi et al. | 709/250 |
| 6,686,838 B1 | 2/2004 | Rezvani et al. | 340/506 |
| 6,691,096 B1 | 2/2004 | Staats | 707/1 |
| 6,718,497 B1 | 4/2004 | Whitby-Strevens | 714/739 |
| 6,810,452 B1 * | 10/2004 | James et al. | 710/104 |
| 6,813,282 B1 * | 11/2004 | Domon | 370/516 |
| 6,895,009 B1 * | 5/2005 | Stallkamp | 370/394 |
| 6,975,647 B2 * | 12/2005 | Neale et al. | 370/466 |
| 7,035,272 B2 * | 4/2006 | Nomura | 370/412 |
| 7,058,081 B2 * | 6/2006 | Yoshida et al. | 370/466 |
| 7,106,224 B2 * | 9/2006 | Knapp et al. | 341/61 |
| 7,107,605 B2 | 9/2006 | Janik | |
| 7,130,616 B2 | 10/2006 | Janik | |
| 7,133,407 B2 * | 11/2006 | Jinzaki et al. | 370/395.64 |
| 7,142,934 B2 | 11/2006 | Janik | |
| 7,142,935 B2 | 11/2006 | Janik | |
| 7,167,765 B2 | 1/2007 | Janik | |
| 2001/0000071 A1 * | 3/2001 | Nichols | 370/395 |
| 2001/0001151 A1 | 5/2001 | Duckwall et al. | 710/8 |
| 2001/0019561 A1 * | 9/2001 | Staats | 370/487 |
| 2001/0024423 A1 | 9/2001 | Duckwall et al. | 370/254 |
| 2002/0057655 A1 | 5/2002 | Staats | 370/256 |
| 2002/0085581 A1 | 7/2002 | Hauck et al. | 370/442 |
| 2002/0101231 A1 | 8/2002 | Staats | 324/126 |
| 2002/0103947 A1 | 8/2002 | Duckwall et al. | 710/19 |
| 2002/0145702 A1 * | 10/2002 | Kato et al. | 352/1 |
| 2002/0172226 A1 | 11/2002 | Staats | 370/503 |
| 2002/0188780 A1 | 12/2002 | Duckwall | 710/105 |
| 2002/0188783 A1 | 12/2002 | Duckwall et al. | 710/119 |
| 2003/0037161 A1 | 2/2003 | Duckwall et al. | 709/233 |
| 2003/0055999 A1 | 3/2003 | Duckwall et al. | 709/236 |

| | | | |
|---|---|---|---|
| 2003/0110206 A1* | 6/2003 | Osokine | 709/201 |
| 2003/0202506 A1* | 10/2003 | Perkins et al. | 370/352 |
| 2004/0037309 A1 | 2/2004 | Hauck et al. | 370/462 |
| 2004/0130552 A1* | 7/2004 | Duluk et al. | 345/506 |

FOREIGN PATENT DOCUMENTS

EP          1 085 706 A3      10/2002

OTHER PUBLICATIONS

"Information technology-Microprocessor systems-Control and Status registers (CSR) Architecture for microcomputer buses", [ANSI/IEEE Std 1212, 1994 Ed.], *The Institute of Electrical and Electronics Engineers, Inc.*, pp. 1-122, Oct. 5, 1994.

Bregni et al.; Jitter Testing Technique and Results at VC-4 Desynchronizer Output of SDH Equipment, *IEEE Transactions on Instrumentation and Measurement*, vol. 44, Issue 3, pp. 675-678, Jun. 1995.

"IEEE Standard for a High Performance Serial Bus", IEEE Standard 1394-1995, Institute of Electrical and Electronics Engineers, Inc., Aug. 30, 1996.

Shiwen et al., Parallel positive justification in SDH C-4 mapping, *IEEE International Conference on Communications*, vol. 3, pp. 1577-1581, Jun. 12, 1997.

"AV/C Digital Interface Command Set General Specification, Rev. 3.0", 1394 Trade Association, pp. 4-5, 20-34, Apr. 15, 1998.

"Enhancements to the AV/C General Specification 3.0 Version 1.0FC1", 1394 Trade Association, pp. 4, 6-17, Nov. 5, 1998.

"Information Technology-Fibre Channel-Methodologies for Jitter Specification", *NCITS Technical Report (NCITS TR-25/1999. Rev 10)*, pp. 1-96, Jun. 9, 1999.

"IEEE Standard for a High Performance Serial Bus-Amendment 1", Institute of Electrical and Electronics Engineers, Inc., pp. 1-196, 2000 (no month).

P1394b IEEE Draft Standard for a High Performance Serial Bus (High Speed Supplement), Institute of Electrical and Electronics Engineers, Inc., pp. 1-408, 2001 (no month).

* cited by examiner

SOURCE PACKET BRIDGE

FIELD OF THE INVENTION

The present invention relates broadly to networks of devices that share data. Specifically, the present invention relates to a node that has two ports and an internal interface between the ports, where data is received on one port and transmitted on the other port. More specifically, the present invention relates to a communication function between ports on a node that does not require a common time base to be distributed across the network.

BACKGROUND OF THE INVENTION

A service proxy is often used as a data bridge in applications that adhere to the IEEE 1394.1 Serial Bus Standard. A service proxy preserves legacy interoperability for devices such as audio/video (AV) devices that aren't bridge aware. A local bridge acting as a service proxy serves as an AV target for a legacy controller and then sends AV commands to another bridge acting as service proxy on a remote bus. The service proxy on the remote bus, posing as a local AV controller, in turn forwards the AV commands to the real AV target. After connecting the legacy controller and target in this fashion with service proxies, transmission of isochronous stream data may begin with isochronous data from the source bus being repeated across intervening buses to the final sink bus.

The repeating of isochronous data from one bus to another (through possible intervening buses) poses some challenges. Specifically, the time base for any given bus can be different from any other bus by as much as +/−100 parts per million (ppm). Such variations in time bases may cause overruns and underruns when data is passed between buses having different time bases. A method is required to synchronize the various isochronous elements such as a sink bus, source bus, or intermmediate buses, so that the isochronous data path faithfully recreates the source data rate without overruns or underruns.

The IEEE1394.1 standard defines a solution to this data rate matching problem that forces synchronization of all buses to a common BASE_RATE. According to the IEEE1394.1 solution, a bridge issues commands on an attached bus to speed up or slow down the cycle master for a particular bus. Doing so in a recursive or distributed fashion allows all buses to be synchronized to a single clock reference contained in the 1394.1 net cycle master. Having established a single clock reference, isochronous packets captured on one bus, such as the source bus, can be faithfully repeated cycle by cycle on all intervening buses and on the final sink bus without risking overflow or underflow.

However, several shortcomings are evident in the IEEE 1394.1 solution. The IEEE1394.1 solution requires a cycle master on each bus to be capable of adjusting its time base on command. Existing cycle master devices do not have this capability. Consequently, bridge devices often must serve as the root on each local bus to provide the cycle adjustment capability. Forcing the bridge device to be root may not be optimal, however, for certain circumstances and performance considerations. For example, it is preferred to have a B device be root over a legacy device.

Another challenge is that network-wide propagation of the master time reference requires bridge devices to be capable of forwarding the time reference from one portal to another portal. While this may be a simple task if both portals are located in the same enclosure, silicon die, etc., it becomes more problematic in the case of a distributed bridge in which the portals are physically separated, such as by a wireless connection.

SUMMARY OF THE INVENTION

The present invention overcomes the shortcomings of the IEEE1394.1 solution by providing a communication function between ports on a node that does not require a common time base to be distributed across the network.

In one aspect, the present invention provides a method of implementing a source packet bridge on a network, the method comprising receiving a data stream over a first port; recreating the data stream on an interface between the first port and a second port; the second port sampling the data stream on the interface and timestamping the data stream using the time base of the second port; packetizing the data stream; and sending the data stream over the second port to a device.

In another aspect, the present invention provides a method of implementing a source packet bridge on a network, the method comprising receiving a data stream over a first port; extracting a time stamp from a received packet; comparing the timestamp to a cycletimer value on a bus attached to the first port to calculate an offset value; adding the calculated offset to the cycle timer value on the second port, timestamping the data stream with the calculated offset; repacketizing the data stream; and sending the data stream over the second port to a device.

DETAILED DESCRIPTION

Those of ordinary skill in the art will realize that the following description of the present invention is illustrative only. Other embodiments of the invention will readily suggest themselves to such skilled persons having the benefit of this disclosure.

Although the architecture described herein is described with reference to components for a single computer, the present invention has a broader scope. The architecture may include audio and video components, home appliances, positioning and robotic systems, and test and measurement systems, for example. The present invention may be applied to any arbitrarily assembled collection of nodes linked together as a network of devices. In addition, it is necessary to distinguish a node from a physical computer component. Each component to reside on a bus will have with it at least one node physical layer controller. A given component may be associated with multiple nodes. However, there will usually be a one-to-one correspondence between devices or components and nodes on a bus.

Figure 1:
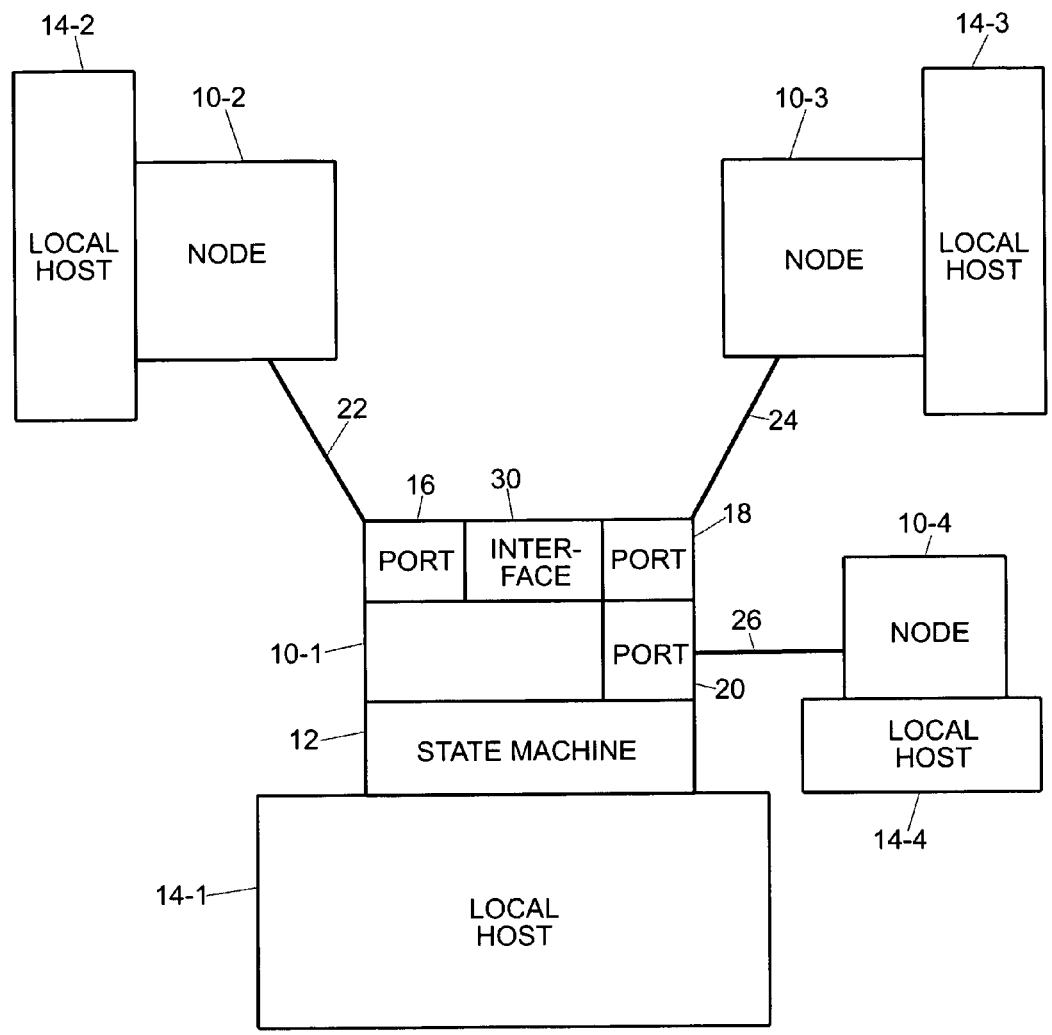
FIG. 1 is a block diagram illustrating a node according to the present invention.

Referring now to FIG. 1, a block diagram of a node 10 is illustrated. In a preferred embodiment, the nodes are designed to be compatible with the IEEE1394.1 standard. Node 10 includes state machine logic 12. State machine logic 12 incorporates all the logic circuitry for carrying out the methodologies and algorithms to be described herein. The circuitry may comprise a programmable logical array (PLA) or be uniquely designed to carry out the functions described herein. Those of ordinary skill in the art, having the benefit of this disclosure, will be able to implement the present invention without undue experimentation.

Node 10 is coupled to local host 14. Local host 14 may be any device one wishes to attach to the bus, such as a disk drive, CPU, keyboard, television, stereo, household appliance, or any other component which needs to communicate with other components in the system.

Node 10 communicates with other nodes through communications links. A link is a connection between two ports. Typically, a cable segment is used for a link. However, a link may be implemented as any physical communication channel, including wireless RF or infrared. A port is the interface between a node and a link. A port has the ability to transmit and receive data. A port can also determine whether it is connected to another port through a link. As illustrated in FIG. 1, node 10 has three external ports 16, 18 and 20 with connecting links 22, 24 and 26, respectively. An internal interface may also be provided between two or more ports on node 10. As shown, interface 30 allows ports 16 and 18 to communicate with each other. As referred to herein, ports 16, 18 and internal interface 30 are referred to collectively as a source packet "bridge."

An individual node may have more than one port, and each node is able to transmit and receive data on any one of its ports. A node is also able to receive and transmit signaling messages through all of its ports. In the discussion that follows, devices and local hosts will, for the most part, be omitted and all references to bus topology will refer to nodes and node connections through various ports.

The present invention overcomes the shortcomings of the IEEE1394.1 solution by providing a communication function between ports on a node that does not require a common time base to be distributed across the network. The present invention bridges isochronous traffic from one bus to another without the cooperation of any other silicon and eliminates the need for a common time base.

Isochronous traffic of most interest in the consumer space is transported on in accordance with the IEEE 1394 standard using the IEEE 61883 transport protocol. In accordance with the IEEE 61883 transport protocol, every isochronous data stream has fixed-length source packets that arrive at a variable bit rate. The IEEE 61883 protocol specifies how each such source packet is divided into data blocks and encapsulated in a IEEE 1394.1-defined isochronous packet complete with a recreation timestamp, and then reassembled and retimed at a IEEE61883-compliant receiver, effectively making a IEEE 1394-compliant bus behave as a pipe having a fixed latency.

The IEEE 61883 protocol accommodates a difference between the application/source clock, such as a video clock, and the clock in a IEEE1394-compliant bus, which may have a +/−100 ppm variance. This accommodation is accomplished by a transmit rate specified by the IEEE 1394 standard, expressed in data blocks per isochronous interval, which is sufficiently higher than the nominal application rate.

The IEEE 61883 protocol also requires a data sink (receiver) to have a FIFO that holds source packets for a period of time until the playback time, encoded in the packet format defined by the IEEE 1394 standard, has arrived. Within some limits, data transfer is acceptable if an intermediate bridge in the system represents a variable latency in data block delivery between ports. The final receive FIFO will pace things and maintain the fixed latency delivery model of the IEEE 61883 protocol.

By limiting the scope of the problem to 61883 transports, recognizing that the IEEE61883 protocol allows a mismatch in clocks, and assuming the existence of a receive FIFO, the process of repeating isochronous packets one for one between ports on a bridge can be eliminated.

The present invention extracts data blocks received from an inbound 61883 stream and re-packetizes for 61883 delivery outbound on the bridge's port. The re-packetization is performed in the time domain of the second port according to the data rate specified for the stream.

The effect is that the inbound packing may not exactly match the outbound packing. As an example, if the receiving port has a time base faster than that of the transmitting port, then there will be more data block per isochronous packet on the transmitting portal on average than the receiving port. Effectively, the transmitting port is unable to keep up with the receiving port and begins to accumulate data blocks in its internal FIFO. Finally, when an empty or partially-packed isochronous packet is received from the receiving port, the transmitting port can compensate by sending a full or partially-full packet. Thus, fewer isochronous intervals on the transmitting port are empty or partially packed.

While latency for data blocks is no longer constant and a one-cycle jitter is added, the end-to-end application works fine since the receive FIFO compensates. The average bandwidth into and out of the bridge remains constant as there are faster packets with more empties instead of slower packets with less empties and, as a result, FIFO depths remain finite. Enough empty packets are sent at the application source so that slower buses can keep up. The +/−0.100 ppm clock variance isn't cumulative across each bridge since the time base of each bus is +/−100 ppm from an ideal value, not from a neighboring bus. The network-wide variance is bounded within +/−100 ppm allowance. Thus, the present invention supports a wide variety of intervening bridges/buses.

Figure 2:
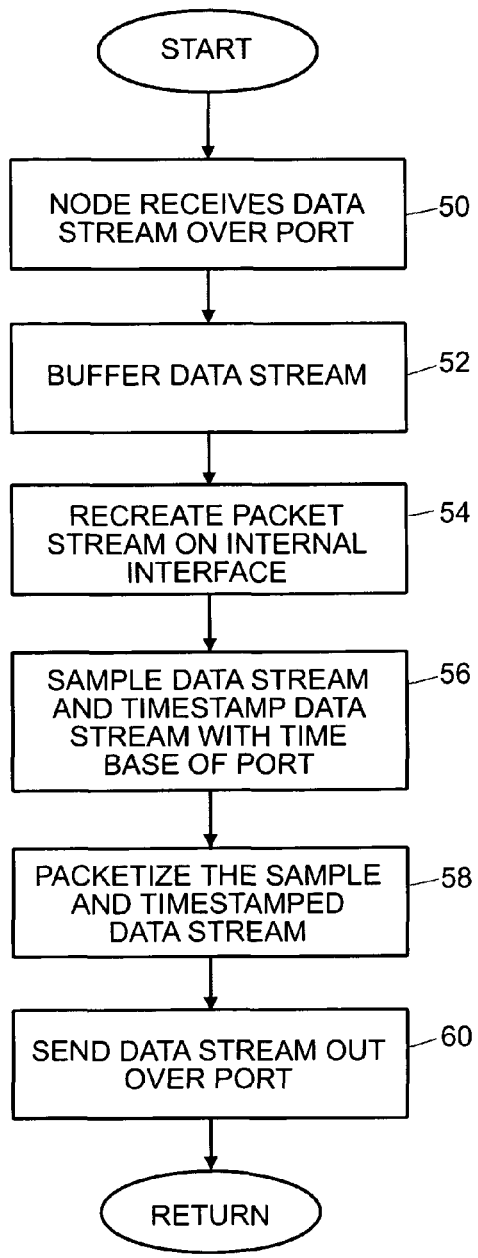
FIG. 2 is a detailed flow chart diagram illustrating acts performed in accordance with an embodiment of the present invention.

Directing attention to FIG. 2, an embodiment of the present invention closely adheres to the IEEE 61883 transport protocol and smoothes data by recreating the actual source packet stream internal to the bridge and the re-transmitting the packet stream as if the bridge were the source of the data. This is accomplished by node 10 acting as a receiver for a data stream received on port 16 (reference numeral 50). Receive rules according to the IEEE 61883 transport protocol are implemented on node 10 for port 16, and the encapsulated data stream is locally buffered (reference numeral 52) and played back across internal interface 30 according to the presentation timestamps. At reference numeral 54, the source packet stream is recreated on internal interface 30 using only the time base of port 16. At reference numeral 56, port 18 samples the data stream present at internal interface 30, and timestamps the data stream with the time base of port 18 as if internal interface 30 is actually the application real time interface connected to, for example, an MPEG codec. The sampled and timestamped stream is then packetized (reference numeral 58) using rules defined in the IEEE61883 transport protocol, which specify requirements such as minimum and maximum numbers of data blocks per isochronous period, etc. At reference numeral 60, the data stream is then sent out port 18 for recreation at a device such as a receiver or the next intermediate bridge.

Figure 3:
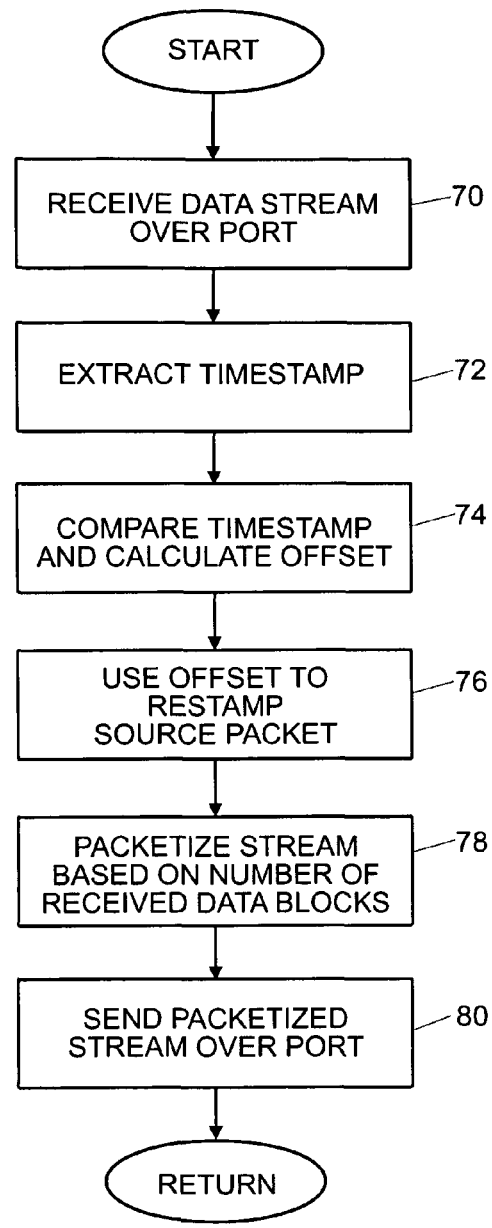
FIG. 3 is a detailed flow chart diagram illustrating acts performed in accordance with another embodiment of the present invention.

FIG. 3 illustrates a sequence of acts performed in another embodiment of the present invention. Beginning at reference numeral 70, a data stream is received over port 16. Receive rules according to the IEEE 61883 transport protocol are implemented on node 10 for port 16. At reference numeral 72, the timestamp embedded in the beginning of a source packet received on port 16 is extracted from the received data stream.

At reference numeral 74, the timestamp value is compared to the cycletimer value on the bus attached to port 16 and an offset value is calculated as follows. For each source packet arriving from bus 22 that is forwarded to bus 24, an offset is added to the existing presentation timestamp to account for the difference in absolute time between bus 22 and bus 24 as well as to account for the additional latency introduced by the store and forward source packet bridge. The offset can be calculated as:

$$\text{TimeStamp for packet on bus } \mathbf{24} = \text{TimeStamp from packet received from bus } \mathbf{22} + (\text{CurrentTime on bus } \mathbf{24} - \text{CurrentTime on bus } \mathbf{22}) + \text{Klatency} \quad (1)$$

The value for (CurrentTime on bus 24−CurrentTime on bus 22) is not a constant and should be dynamically evaluated each time the timestamp adjustment is to be performed.

The Klatency term is a constant which typically would be >= to the worst case delay (measured with respect to bus 24's time) from when a source packet arrives from bus 22 and it is repeated onto bus 24.

At reference numeral 76 the calculated offset is then used to restamp the source packet on port 18 by adding the offset to the cycle timer value on the bus attached to port 18. With the source packet time stamp suitably adjusted, outbound 61883 packetization is performed at reference numeral 78 based on the number of data blocks already received from port 16 and in consideration of the maximum number of data blocks which can be packed together. At reference numeral 80, the packetized data stream is sent over port 18 to a device such as another bridge in the network or an AV device that consumes the data stream. By skipping the step in which source packets are time released from port 16 to port 18 according to the precise source packet timestamps, the source data can become more bursty on the various bus segments relative to the first embodiment. But the maximum packing rules limit the burstiness, and the receive FIFOs are likely to be sufficiently to handle any greater varience in burst rate versus average rate introduced by the simplification. The embodiment illustrated in FIG. 3 and described above makes no attempt to smooth the replay of the data.

In the embodiments of the present inventions illustrated in FIGS. 2 and 3 and described above, the resulting data transmitted over port 18 can be sent to another intermediate source packet bridge, or may be sent directly to an A/V device described above for consumption by the device.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

The invention claimed is:

1. A method of implementing a source packet bridge on a network of nodes, comprising:
   providing a node having a first port, the first port having a first time base, a second port, the second port connected to a second bus having a second time base, and an internal interface between the first port and the second port, wherein the first port is connected to a first bus, the first bus having a first cycletimer value, and wherein the second port is connected to a second bus, the second bus having a second cycletimer value that has a time base different than that of the first cycletimer value;
   receiving a data stream containing a first set of packets over the first port and extracting a timestamp from a packet, wherein each packet of said first set of packets comprises a plurality of data blocks;
   dynamically evaluating a difference between the first cycletimer value and the second cycletimer value;
   adjusting the timestamp by adding to it said difference and a latency value;
   said latency value being greater than or equal to a predetermined delay value; said delay value calculated with respect to said second time base;
   accumulating data blocks from said first set of packets within an internal (first in first out) FIFO;
   packetizing and transmitting a second set of packets over the second port, said second set of packets comprising data blocks retrieved from the internal FIFO; and
   wherein the internal FIFO enables packing of a first packet of the second set of packets with data blocks accumulated over a plurality of the first set of packets.

2. The method of claim 1, wherein the data stream received over the first port is an isochronous data stream that is compliant with the IEEE 61883 Transport Protocol.

3. The method of claim 1, wherein the rate of packets received over the first port is substantially equivalent to the rate of packets transmitted over the second port.

4. The method of claim 1, wherein the rate of packets received over the first port is substantially different to the rate of packets transmitted over the second port.

5. The method of claim 1, wherein the packets received over the first port are compliant with an IEEE 1394 high speed bus.

6. The method of claim 1, wherein the packets transmitted over the second port are compliant with an IEEE 1394 high speed bus.

7. The method of claim 1, wherein the packets transmitted over the second port contain audio/visual (A/V) content.

8. A system to re-packetize incoming data encapsulated within one or more packets, the system comprising:
   a first bus operating at a first clock frequency to receive one or more incoming data;
   a second bus operating at a second clock frequency, different than the first clock frequency, to transmit a modified version of the incoming data as output data; and
   a latency adjustment module that comprises logic configured to:
     accumulate data blocks from the one or more incoming data within an internal (first in first out) FIFO;
     where the internal FIFO is configured to pack a first packet of the output data with data blocks accumulated from the one or more incoming data;
     transmit the output data over the second bus;
     wherein the output data comprises an outgoing packing density, the incoming data comprises an incoming packing density, and the incoming packet density and outgoing packing density are substantially different; and
     wherein the latency adjustment module is further configured to compensate for the substantial difference between the outgoing packing density and the incoming packing density to maintain a substantially constant bandwidth into and out of the system.

9. The system of claim 8, wherein the one or more incoming data received over the first port is compliant with the IEEE 61883 Transport Protocol.

10. The system of claim 8, wherein the one or more incoming data received over the first port is isochronous.

11. The system of claim 8, where the substantial difference comprises a difference in a number of packets received via the first bus and a number of packets transmitted via the second bus.

12. The system of claim 11, wherein the packets received over the first bus are compliant with an IEEE 1394 high speed bus.

13. The system of claim 11, wherein the packets transmitted over the second bus are compliant with an IEEE 1394 high speed bus.

14. The method of claim 11, wherein the system maintains a bounded clock variance.

15. A source bridge apparatus, comprising:
   a first bus operating at a first clock frequency to receive one or more incoming data;
   a second bus operating at a second clock frequency;
   an internal (first in first out) FIFO, where the internal FIFO is configured to pack a first packet of an output data with data blocks accumulated from the one or more incoming data;
   a processor; and
   a computer readable non-transitory storage medium with at least one computer program stored thereon, the at least one computer program configured to, when executed on the processor:
      accumulate data blocks from the one or more incoming data within the internal FIFO;
      determine an outgoing packing density and an incoming packing density; and
      when the incoming packet density and outgoing packing density are substantially different, compensate for the substantial difference between the outgoing packing density and the incoming packing density to maintain a substantially constant bandwidth into and out of the source bridge apparatus.

16. The source bridge apparatus of claim 15, wherein the outgoing packing density is expressed in data blocks per isochronous interval.

17. The source bridge apparatus of claim 15, wherein the incoming packing density is expressed in data blocks per isochronous interval.

18. The source bridge apparatus of claim 15, wherein the first bus is compliant with an IEEE 1394 standard.

19. The source bridge apparatus of claim 15, wherein the second bus is compliant with an IEEE 1394 standard.

20. A method, comprising:
   receiving data packets on a first bus having a first time base;
   accumulating the received data packets within an internal (first in first out) FIFO;
   recreating the data packets on the internal FIFO in accordance with the first time base, the internal FIFO being adapted to emulate an application interface associated with a coder/decoder;
   sampling the data packets from the internal FIFO at a second bus, the second bus being capable of transmitting a full or partially-full packet upon receiving an empty or partially packed isochronous packet from the first bus and maintaining a fixed latency delivery model of the IEEE 61883 transport protocol;
   stamping with a timestamp associated with a second time base the data packets received from the internal FIFO in response to performance of a dynamic evaluation, the dynamic evaluation comprising an evaluation of each packet of the data packets on the second bus prior to the stamping; and
   packetizing the stamped and sampled data packets utilizing an IEEE 61883-compliant transport protocol to conform with a minimum and maximum number of data blocks per isochronous period, the minimum and maximum number of data blocks being adapted to be responsive to a number of data blocks received at the first bus, and the maximum number of data blocks that can be packed together;
   wherein the second bus does not receive synchronization commands from the first bus.

21. The method of claim 15, wherein the application interface is associated with an audio/visual (A/V) application.

* * * * *